United States Patent
Song et al.

(10) Patent No.: US 12,388,567 B2
(45) Date of Patent: Aug. 12, 2025

(54) METHOD AND APPARATUS FOR TRANSMITTING REFERENCE SIGNAL TRANSMISSION AND COMMUNICATION SYSTEM

(71) Applicant: FUJITSU LIMITED, Kawasaki (JP)

(72) Inventors: Lei Song, Beijing (CN); Lei Zhang, Beijing (CN); Zhe Chen, Beijing (CN); Xianjun Yang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 439 days.

(21) Appl. No.: 17/506,815

(22) Filed: Oct. 21, 2021

(65) Prior Publication Data

US 2022/0045792 A1     Feb. 10, 2022

Related U.S. Application Data

(63) Continuation of application No. PCT/CN2019/085365, filed on Apr. 30, 2019.

(51) Int. Cl.
*H04L 1/08*    (2006.01)
*H04L 1/1829*    (2023.01)
(Continued)

(52) U.S. Cl.
CPC ............. *H04L 1/08* (2013.01); *H04L 1/1864* (2013.01); *H04L 1/1893* (2013.01); *H04L 1/1896* (2013.01); *H04L 5/0044* (2013.01); *H04L 5/0048* (2013.01); *H04L 5/0094* (2013.01); *H04W 72/04* (2013.01);
(Continued)

(58) Field of Classification Search
None
See application file for complete search history.

(56) References Cited

U.S. PATENT DOCUMENTS

2015/0249971 A1    9/2015  Yu
2016/0056977 A1    2/2016  Wang et al.
(Continued)

FOREIGN PATENT DOCUMENTS

CN    104349458 A    2/2015
CN    105052044 A    11/2015
(Continued)

OTHER PUBLICATIONS

Munier, U.S. Appl. No. 62/670,298, May 2018 (Year: 2018).*
(Continued)

*Primary Examiner* — Jay L Vogel
(74) *Attorney, Agent, or Firm* — Myers Wolin, LLC

(57) ABSTRACT

A method and apparatus for transmitting a reference signal and a communication system. The reference signal transmission method includes: a transmitter end generates one or more signals corresponding to the same transport block, the one or more signals including a data channel and a reference signal; and the transmitter end transmits the one or more signals in one or more time-domain resource segments, positions of reference signals being determined based on the one or more time-domain resource segments. The terminal equipment and the network device may be able to determine the positions of the reference signals in an actual repetition according to time-domain resource segments occupied by the actual repetition.

17 Claims, 5 Drawing Sheets

(a)

(b)

(c)

(51) Int. Cl.
  *H04L 1/1867* (2023.01)
  *H04L 5/00* (2006.01)
  *H04W 72/04* (2023.01)
  *H04W 72/0446* (2023.01)
  *H04W 72/23* (2023.01)
  *H04W 72/231* (2023.01)
  *H04W 72/232* (2023.01)

(52) U.S. Cl.
  CPC ....... *H04W 72/0446* (2013.01); *H04W 72/23* (2023.01); *H04W 72/231* (2023.01); *H04W 72/232* (2023.01); *H04L 5/0012* (2013.01); *H04L 5/0082* (2013.01); *H04L 5/0092* (2013.01)

(56) References Cited

U.S. PATENT DOCUMENTS

| | | | |
|---|---|---|---|
| 2016/0183231 A1 | 6/2016 | Shi et al. | |
| 2018/0176945 A1* | 6/2018 | Cao | H04L 5/0044 |
| 2018/0213484 A1* | 7/2018 | Oh | H04W 52/42 |
| 2018/0227848 A1 | 8/2018 | Lee et al. | |
| 2018/0278371 A1* | 9/2018 | Chien | H04L 1/0025 |
| 2018/0279327 A1 | 9/2018 | Ying et al. | |
| 2018/0288746 A1* | 10/2018 | Zhang | H04L 12/189 |
| 2018/0316534 A1 | 11/2018 | Shin et al. | |
| 2019/0053211 A1* | 2/2019 | Ying | H04W 72/044 |
| 2019/0174527 A1* | 6/2019 | Park | H04L 25/0224 |
| 2020/0029335 A1* | 1/2020 | Yang | H04W 52/242 |
| 2020/0274670 A1 | 8/2020 | Sun et al. | |
| 2020/0275440 A1* | 8/2020 | Wu | H04W 72/0446 |
| 2021/0250972 A1* | 8/2021 | Munier | H04W 72/23 |

FOREIGN PATENT DOCUMENTS

| | | | |
|---|---|---|---|
| CN | 106162908 A | 11/2016 | |
| CN | 108401292 A | 8/2018 | |
| CN | 109660324 A | 4/2019 | |
| EP | 3 300 262 A1 | 3/2018 | |
| EP | 3 471 321 A1 | 4/2019 | |
| WO | 2014/075270 A1 | 5/2014 | |
| WO | 2018/228305 A1 | 12/2018 | |
| WO | WO-2020069416 A1 * | 4/2020 | ........... H04L 1/1887 |

OTHER PUBLICATIONS

Notice of Reasons for Refusal issued by the Japan Patent Office for corresponding Japanese Patent Application No. 2021-564409, mailed on Oct. 25, 2022, with an English translation.

Sony, Considerations on PUSCH enhancements for URLLC, Agenda Item: 7.2.6.1.3, 3GPP TSG-RAN WG1 Meeting #96, R1-1902178, Athens, Greece, Feb. 25-Mar. 1, 2019.

3GPP TS 38.211, V15.1.0, 3rd Generation Partnership Project; Technical Specification Group Radio Access Network; NR; Physical channels and modulation (Release 15), Mar. 2018.

Panasonic, "On PUSCH enhancements for NR URLLC", Agenda Item: 7.2.6.3, 3GPP TSG-RAN WG1 Meeting #96bis, R1-1904188, Xi'an, China, Apr. 8-12, 2019.

First Office Action and Search Report issued by China National Intellectual Property Administration for corresponding Chinese Patent Application No. 201980095571.9, dated Jun. 1, 2023, with an English translation.

International Search Report and Written Opinion of the International Searching Authority issued by the China National Intellectual Property Administration for corresponding International Patent Application No. PCT/CN2019/085365, mailed on Dec. 31, 2019, with an English translation.

Examination Report issued by the Patent Office of India for corresponding Indian Patent Application No. 202137047888, dated Oct. 20, 2022, with an English translation.

Communication pursuant to Rule 164(1) EPC with the partial supplementary European search report issued by the European Patent Office for corresponding European Patent Application No. 19927564.5-1215, mailed on Apr. 14, 2022.

Notice of Preliminary Rejection issued by the Korean Intellectual Property Office for corresponding Korean Patent Application No. 10-2021-7038965, mailed on Aug. 31, 2023, with an English translation.

Mediatek Inc., "Enhancements of NR PUSCH for URLLC", Agenda Item: 7.2.6.1.3, 3GPP TSG-RAN WG1 Meeting #96, R1-1901824, Athens, Greece, Feb. 25-Mar. 1, 2019.

3GPP TS 38.211 V15.5.0, "3rd Generation Partnership Project; Technical Specification Group Radio Access Network; NR; Physical channels and modulation (Release 15)" Mar. 2019.

Nokia et al., Summary of offline discussion on PUSCH enhancements for NR eURLLC, Agenda Item: 7.2.6.3, 3GPP TSG-RAN WG1 Meeting #96bis, R1-1905885, Xi'an, China, Apr. 8-12, 2019.

Nokia et al., "On PUSCH enhancements for NR URLLC", Agenda Item: 7.2.6.1.3, 3GPP TSG-RAN WG1 Meeting #96, R1-1901915, Athens, Greece, Feb. 25-Mar. 1, 2019.

Notice of Last Preliminary Rejection issued by the Korean Intellectual Property Office for corresponding Korean Patent Application No. 10-2021-7038965, mailed on May 17, 2024, with an English translation.

Nokia et al., "Summary of Thursday offline discussion on PUSCH enhancements for NR eURLLC (AI 7.2.6.3)", Agenda Item: 7.2.6.3, 3GPP TSG-RAN WG1 Meeting #96bis, R1-1905815, Xi'an, China, Apr. 8-12, 2019.

* cited by examiner

501 a network device configures time-domain resource allocation information, the time-domain resource allocation information not containing a data channel type, or the time-domain resource allocation information containing the number of nominal repetition transmissions, or the time-domain resource allocation information containing joint encoding of a data channel type and the number of nominal repetition transmissions

502 the network device transmits the time-domain resource allocation information

FIG. 5

601 a network device generates downlink control information, the downlink control information including an information field, the information field being used for indicating a mode of repetitions or indicating a mode of repetitions and the number of nominal repetitions or indicating time domain resource allocation and number of nominal repetitions

602 the network device transmits the downlink control information

FIG. 6

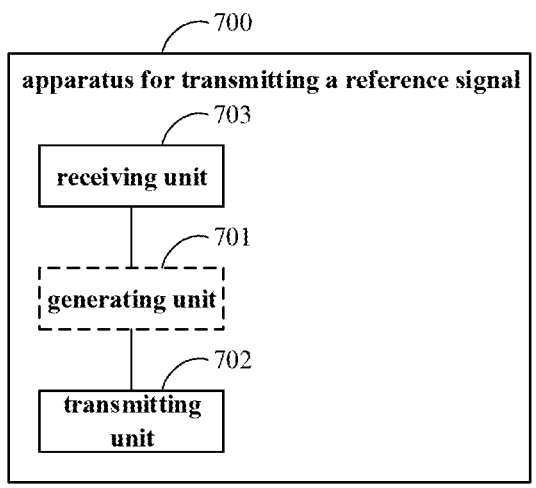

FIG. 7

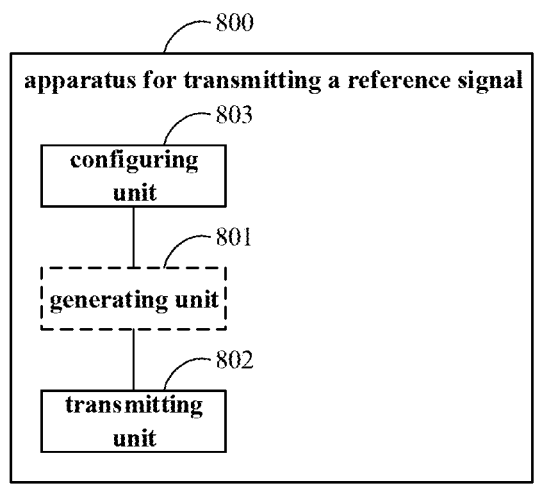

FIG. 8

METHOD AND APPARATUS FOR TRANSMITTING REFERENCE SIGNAL TRANSMISSION AND COMMUNICATION SYSTEM

CROSS-REFERENCE TO RELATED APPLICATION

This application is a continuation application of International Application PCT/CN2019/085365 filed on Apr. 30, 2019 and designated the U.S., the entire contents of which are incorporated herein by reference.

FIELD

This disclosure relates to the field of communications, and in particular to a method and apparatus for transmitting a reference signal and a communication system.

BACKGROUND

In a New Radio (NR) system, it is necessary to support some low-latency and high-reliability service scenarios, such as Augmented Reality (AR)/Virtual Reality (VR), factory automation, transportation scenarios including remote driving, and distributed power system control, etc. These services have a latency requirement of 0.5 ms-1 ms and a reliability requirement of le-6. Therefore, a fifth-generation (5G) mobile communication system needs to study transmission technologies with high reliability and low latency to meet these service scenarios.

In order to improve reliability of transmission, Release 15 (Rel-15) has supported repetition transmission (referred to as repetition for short) of data channels, that is, multiple redundant versions of the same transport block (TB) are repeatedly transmitted in multiple consecutive slots. In order to continue to maintain the reliability of transmission and further reduce transmission latency, time-domain resources of multiple repetition transmissions may be adjusted to complete transmission of multiple repetitions in a possibly shortest time, such as transmitting multiple repetitions in one slot, etc.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

On the other hand, in order to improve the reliability of transmission, at the 96th meeting (#96) of the Radio Access Network Working Group 1 (RAN1) of the Third Generation Partnership Project (3GPP), three methods for transmitting a physical uplink shared channel (PUSCH) or a signal were proposed, one of which is that: a network device schedules a TB to perform multiple repetitions, the multiple repetitions may occupy multiple consecutive uplink symbols, with no need of a gap, in encountering a slot boundary or downlink (DL)/uplink (UL) transition point, additional processing is required, that is, one repetition will be split into multiple repetitions, such that each repetition is transmitted in one UL cycle of one slot. Compared with the repetition of Rel-15, the transmission latency of such repetition may be greatly reduced.

However, it was found by the inventors that according to a specification in Rel-15, transmission of a demodulation reference signal (DMRS) is associated with transmission of a data channel or signal. When one repetition is split into multiple repetitions, there is no solution for whether the DMRS needs to be split and how it can be split.

In order to solve at least one of the above problems or other similar problems, embodiments of this disclosure provide a method and apparatus for transmitting a reference signal and a communication system.

According to a first aspect of the embodiments of this disclosure, there is provided a method for transmitting reference signal, applicable to a transmitter end, the method including:

generating one or more signals corresponding to the same transport block by the transmitter end, the one or more signals including a data channel and a reference signal; and transmitting the one or more signals in one or more time-domain resource segments by the transmitter end, position of the reference signal in the one or more signals being determined based on the one or more time-domain resource segments.

According to a second aspect of the embodiments of this disclosure, there is provided a method for indicating a repetition, applicable to a network device, the method including:

generating downlink control information by the network device, the downlink control information including an information field, the information field being used for indicating a mode of repetition or indicating a mode of repetition and the corresponding number of nominal repetitions; and transmitting the downlink control information by the network device.

According to a third aspect of the embodiments of this disclosure, there is provided an apparatus for transmitting a reference signal, configured in a transmitter end, the apparatus including:

a generating unit configured to generate one or more signals corresponding to the same transport block, the one or more signals including a data channel and a reference signal; and a transmitting unit configured to transmit the one or more signals in one or more time-domain resource segments, position of the reference signal in the one or more signals being determined based on the one or more time-domain resource segments.

According to a fourth aspect of the embodiments of this disclosure, there is provided an apparatus for indicating a repetition, configured in a network device, the apparatus including:

a generating unit configured to generate downlink control information, the downlink control information including an information field, the information field being used for indicating a mode of repetition or indicating a mode of repetition and the corresponding number of nominal repetitions; and a transmitting unit configured to transmit the downlink control information.

According to a fifth aspect of the embodiments of this disclosure, there is provided a terminal equipment, including the apparatus as described in the third aspect.

According to a sixth aspect of the embodiments of this disclosure, there is provided a network device, including the apparatus as described in the third or the fourth aspect.

According to a seventh aspect of the embodiments of this disclosure, there is provided a communication system, including the terminal equipment as described in the fifth aspect and the network device as described in the sixth aspect.

According to another aspect of the embodiments of this disclosure, there is provided a computer readable program, which, when executed in a terminal equipment, will cause a computer to carry out the method described in the first aspect in the terminal equipment.

According to a further aspect of the embodiments of this disclosure, there is provided a storage medium storing a computer readable program, which will cause a computer to carry out the method described in the first aspect in a terminal equipment.

According to yet another aspect of the embodiments of this disclosure, there is provided a computer readable program, which, when executed in a network device, will cause a computer to carry out the method described in the first or second aspect in the network device.

According to still another aspect of the embodiments of this disclosure, there is provided a storage medium storing a computer readable program, which will cause a computer to carry out the method described in the first or second aspect in a network device.

An advantage of the embodiments of this disclosure exists in that according to at least one aspect of the embodiments of this disclosure, understandings for the transmission of the reference signals by both the network device and the terminal equipment are consistent, and reliability of the transmission of the reference signals is improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps or components thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 5 is a schematic diagram of the method for configuring number of repetitions of Embodiment 2;

FIG. 6 is a schematic diagram of the method for indicating a repetition of Embodiment 3;

FIG. 7 is a schematic diagram of the apparatus for transmitting a reference signal of Embodiment 4;

FIG. 8 is another schematic diagram of the apparatus for transmitting a reference signal of Embodiment 4;

DETAILED DESCRIPTION OF THE DISCLOSURE

Figure 1:
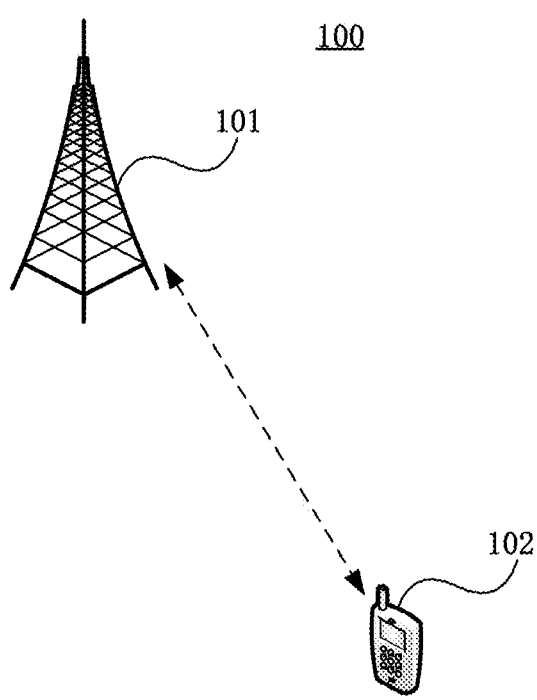
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication specifications at any stage, which may, for example, include but not limited to the following communication specifications: 1G (generation), 2G, 2.5G, 2.75G, 3G, 4G, 4.5G, and 5G and new radio (NR) in the future, etc., and/or other communication specifications that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, an equipment accessing to a communication network and receiving network services via a network device, and may also be referred to as a "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, the communication system 100 may include a network device 101 and a terminal equipment 102. For the sake of simplicity, an example having only one terminal equipment is schematically given in FIG. 1. The network device 101 is, for example, a network device gNB in an NR system.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

In the embodiment of this disclosure, the terminal equipment 102 may transmit data to the network device 101, for example, in a grant or grant-free transmission mode. The network device 101 may receive data transmitted by one or more terminal equipments 102, and feed back information (such as acknowledgement information ACK or non-acknowledgement information NACK) to the terminal equipment 102, and the terminal equipment 102 may acknowledge terminating a transmission process according to the feedback information, or may further perform new data transmission, or may perform data retransmission.

For the convenience of description, some concepts concerned in the embodiments of this disclosure shall be described below.

In the embodiments of this disclosure, there are two types of DMRSs, namely a front-loaded DMRS and an additional DMRS. The front-loaded DMRS always exists, that is, it will always be transmitted, and whether the additional DMRS exists and a location of existence depend on higher-layer signaling configuration and a provision in a specification.

In the embodiments of this disclosure, there are two types of PUSCH transmission, PUSCH mapping type A (referred to as type A PUSCH) and PUSCH mapping type B (referred to as type B PUSCH), and DMRS transmission formats to which these two transmission types correspond are different. For a type A PUSCH, a front-loaded DMRS is always present on a third or fourth symbol of a slot, such as symbol 2 or symbol 3, numbered starting from symbol 0. For a type B PUSCH, a front-loaded DMRS is always present on a first symbol of a scheduled PUSCH.

In the embodiments of this disclosure, an uplink transmission grant (UL grant) of a PUSCH may be in a form of DCI, or may be a scheduling grant configured by RRC signaling, which may include time-domain resource allocation (TDRA) of a first repetition, and time-domain resources of other repetitions may further be determined according to the TDRA of the first repetition and uplink and downlink transmission directions of symbols.

Figure 2:
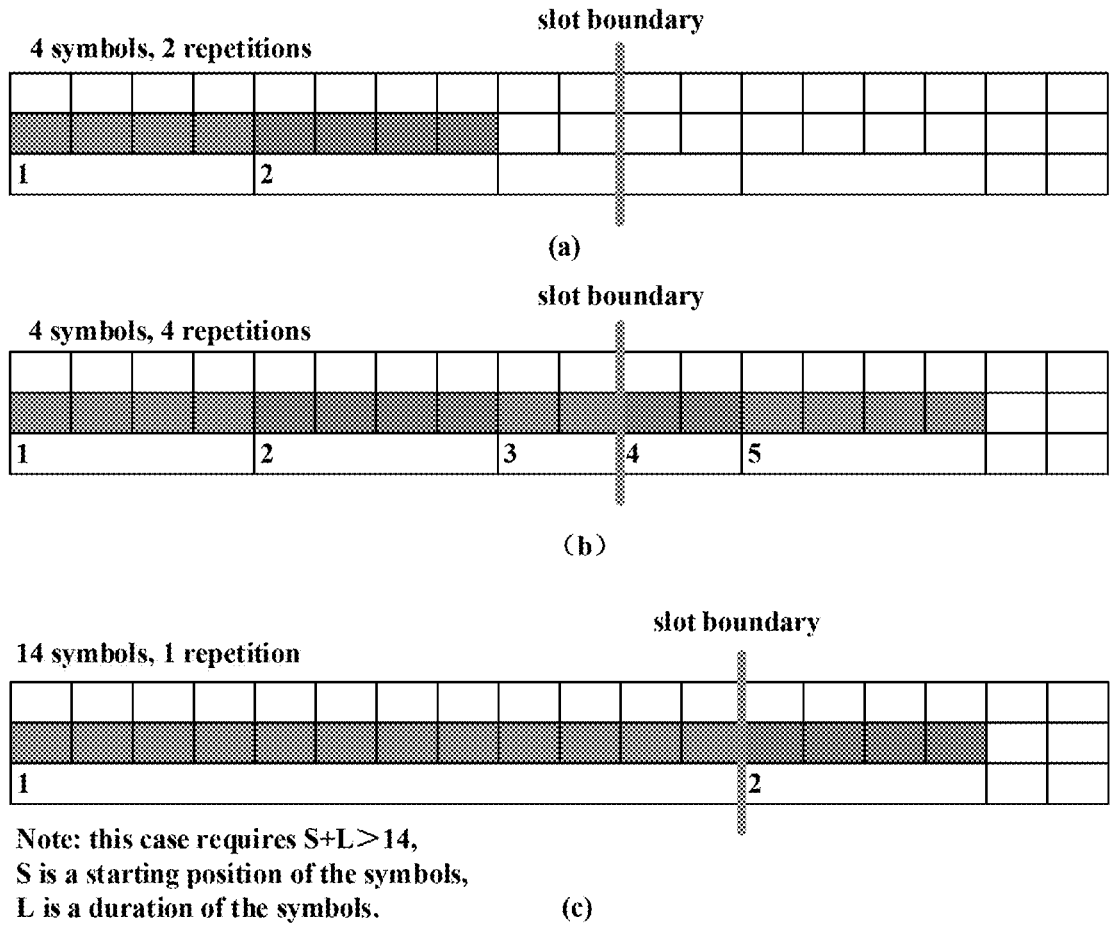
FIG. 2 is a schematic diagram of three examples of a PUSCH repetition.

FIG. 2 is a schematic diagram of three examples of splitting of a PUSCH repetition. In (a) of FIG. 2, the network device indicates that each repetition occupies 4 symbols, and there are total 2 repetitions; in (b) of FIG. 2, the network device indicates that each repetition occupies 4 symbols, and there are total 4 repetitions; in (c) of FIG. 2, the network device indicates that each repetition occupies 14 symbols, and there is total 1 repetition; and in the example of (c) in FIG. 2, it is required that S+L>14; where, S is a starting position of the symbols, and L is a duration of the symbols; and reference may be made to existing standards for definitions thereof.

It can be seen from FIG. 2 that although it is called splitting, the transmitted TB needs to be transmitted in one repetition. Taking (b) in FIG. 2 as an example, a repetition occupies 4 symbols, and there are total 4 repetitions; however, at a slot boundary, the PUSCH needs to be transmitted in the previous slot, and the repetition is transmitted again in the next slot, resulting in 5 repetitions, and the third repetition and the fourth repetition occupy 2 symbols respectively. However, if a repetition before the slot boundary contains a DMRS, how to classify the repetition and whether the DMRS therein also needs to be split are not specified in existing schemes.

Figure 3:
FIG. 3 is a schematic diagram of a position of a reference signal of a repetition.

Taking the repetition shown in FIG. 3 as an example, if the repetition occupies 7 symbols, a first symbol is used to transmit a front-loaded DMRS, a fifth symbol is used to transmit an additional DMRS, and the other symbols are used to transmit data channels or signals, such as a PDSCH or a PUSCH, if there are only 4 symbols left in the current slot, which symbol or symbols are used to transmit a DMRS need to be specified so that the network device and terminal equipment have a consistent understanding. For example, one possibility is that 2 symbols in the 4 symbols are used for DMRS transmission, and another possibility is that only 1 symbol in the 4 symbols is used for DMRS transmission, and so on. It should be noted that a part of REs of the symbol where the DMRS is located may also possibly be used for transmission of data channels or signals.

This embodiment is described by taking that a reference signal is a DMRS and a data channel or signal is an uplink data channel or signal (such as PUSCH) as examples; however, this embodiment is not limited thereto. In this embodiment, the reference signal may also be another reference signal associated with the data channel or signal, and the data channel or signal may also be a downlink data channel or signal, such as a PDSCH.

Various implementations of this disclosure shall be described below with reference to the accompanying drawings. These implementations are illustrative only, and are not intended to limit this disclosure.

Embodiment 1

Figure 4:
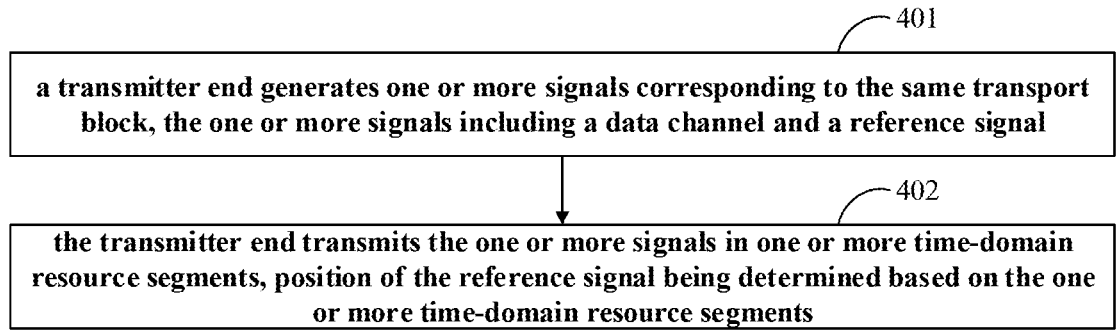
FIG. 4 is a schematic diagram of the method for transmitting a reference signal of Embodiment 1.

The embodiment of this disclosure provides a method for transmitting a reference signal, applicable to a transmitter end, which may be a terminal equipment, or may be a network device. FIG. 4 is a schematic diagram of the method for transmitting a reference signal of this embodiment. Referring to FIG. 4, the method includes:

step 401: a transmitter end generates one or more signals corresponding to the same transport block, the one or more signals including a data channel and a reference signal; and step 402: the transmitter end transmits the one or more signals in one or more time-domain resource segments, position of the reference signal in the one or more signals being determined based on the one or more time-domain resource segments.

In this embodiment, the transmitter end determines the position of the reference signal according to a time-domain resource segment occupied by an actual repetition (the above transmitted one or more signals), rather than only according to the number of repetition s configured or indicated by the network device and the type of reference signal, so that the network device and the terminal equipment have a consistent understanding for the transmission of the reference signal, thereby improving reliability of the reference signal transmission. The number of repetitions configured or indicated by the network device shall be described later.

In this embodiment, among the above one or more signals, one or some signals may include both data channels and reference signals, or one or some signals may only include data channels but not include reference signals. Each of the one or more signals including a data channel and a reference signal is taken as an example in this embodiment; however, this embodiment is not limited thereto.

In one implementation, the above one or more signals may include a first signal and a second signal. The first signal and the second signal correspond to the same transport block, such as two repetitions of a transport block, and the first signal and the second signal respectively include a data channel and a reference signal, the transmitter end may transmit the first signal at a first time-domain resource segment, and transmit the second signal at a second time-domain resource segment, a position of the reference signal in the first signal may be determined based on the first time-domain resource segment, and a position of the reference signal in the second signal may be determined based on the second time-domain resource segment.

In another implementation, the one or more signals may include the first signal, the second signal and a third signal. The third signal also corresponds to the above transport block, that is, the first signal, the second signal and the third signal are repetitions of the above transport block. The third signal may also include a data signal and a reference signal, and the transmitter end may transmit the third signal at a third time-domain resource segment, a position of the reference signal in the third signal may be determined based on the third time-domain resource segment.

In this implementation, there may be one or more third time-domain resource segments, and correspondingly, there may be one or more third signals.

In this embodiment, the number of repetitions of the transport block, i.e. the number of repetitions, is not configured or indicated by the network device, but actually occurs. A position of the reference signal in each repetition is determined according to a time-domain resource segment occupied by the repetition, thereby avoiding inconsistent understanding for the transmission of the reference signal by the network device and the terminal equipment, and improving reliability of the transmission of the reference signal.

In this embodiment, the position of the reference signal may be determined based on at least one of the following:

a symbol length of the time-domain resource segment;

TDRA configuration or indication of the time-domain resource segment;

higher layer signaling configuration; and a provision in a specification.

For example, the position of the reference signal may be determined based on the symbol length of the time-domain resource segment. For example, the transmitter end may determine a time-domain resource segment occupied by each repetition according to a TDRA indicated in a UL grant, and then determine the position of the reference signal according to the symbol length of the time-domain resource segment of each repetition. Here, "position" refers to a position of a symbol occupied by the above reference signal, thus, the number of reference signals is implicitly included. In this embodiment, unless otherwise specified, identical expressions have identical meanings. The above UL grant may be configured by DCI signaling, or may be configured by RRC signaling; however, this embodiment is not limited thereto, and it may also be separate signaling or parameter or indication.

It is assumed that the number of repetitions actually transmitted is N, and symbol lengths of time-domain resource segments of the repetitions are K1, K2, ..., KN. Therefore, a table of DMRS positions may be defined in a specification, and the DMRS locations may be determined according to the symbol lengths (K1, K2, ..., KN) of the time-domain resource segments. Or, Table 6.4.1.1.3-3 in the current specification TS38.211 may be followed, and $1_d$ in the table is replaced with the symbol lengths (K1, K2, ..., KN) of the time-domain resource segments, or $1_d$ may be interpreted as the symbol lengths (K1, K2, ..., KN)

of the time-domain resource segments, that is, $1_d$ is the symbol lengths (K1, K2, . . . , KN) of the time-domain resource segments. Table 6.4.1.1.3-3 in the current specification TS38.211 is as follows.

| | DM-RS positions l | | | | | | | |
|---|---|---|---|---|---|---|---|---|
| | PUSCH mapping type A dmrs-AdditionalPosition | | | | PUSCH mapping type B dmrs-AdditionalPosition | | | |
| $l_d$ in symbols | 0 | 1 | 2 | 3 | 0 | 1 | 2 | 3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

For another example, the position of the reference signal may be determined based on configuration or indication of the TDRA of the time-domain resource segment. For example, if the TDRA in the UL grant configures or indicates that S+L≤14, in addition to the first type of reference signals, each repetition (the above signal) may also contain second type of reference signals; and if S+L>14, each repetition (the above signal) contains only the first type of reference signals; where, S is a symbol starting position of the time-domain resource segment, and L is a symbol length of the indicated time-domain resource segment. Here, the first type of reference signals is, for example, the above front-loaded DMRS, and the second type of reference signals is, for example, the above additional MDRS; however, this embodiment is not limited thereto. In the following description, unless otherwise specified, identical expressions have the identical meaning, which shall not be described herein any further.

For another example, the position of the reference signal may be jointly determined based on a symbol length of an actual time-domain resource segment and a symbol length of a time-domain resource segment configured or indicated by the TDRA. For example, if the symbol length of the actual time-domain resource segment (such as the number of an actual available uplink symbols) is K and the symbol length of the time-domain resource segment configured or indicated by TDRA is L, if L>K, the position of the reference signal may be determined according to the symbol length (K) of the actual time-domain resource segment. For example, taking that L=7, the reference signal is DMRS and its position is as shown in FIG. 3 as an example, when K=4, the number of symbols of the DMRS may be reduced from 2 to 1; when K=5, the number of symbols of the DMRS may be set to be 2; and if L=K, the position of the DMRS may be determined according to the above configured or indicated symbol length (L) of the time-domain resource segment. In addition, in the specification, a DMRS position table may also be defined, and position of the DMRS may be queried according to the symbol length (K) of the actual time-domain resource segment and the symbol length (L) of the time-domain resource segment configured or indicated by the TDRA.

For another example, the transmitter end may determine the position of the reference signal according to a provision in the specification. Taking that the transmitter end is a terminal equipment as an example, when the network device configures the terminal equipment to perform repetition, the terminal equipment may determine the position of the reference signal according to a provision in the specification, that is, the terminal equipment expects that the network device will not configure the second type of reference signals, that is, the position of the second type of reference signals is always 'pos0'. Still taking that the transmitter end is a terminal equipment as an example, when the network device configures the terminal equipment to perform repetition, if the network device configures one or more second type of reference signals, the terminal equipment determines the position of the reference signal according to a provision in the specification, that is, it will perform assuming that the network device does not configure the second type of reference signals.

The above embodiments are applicable to a scenario where the data channel in the above signal is configured as being of the second type and the network device configures the second type of reference signals. However, this embodiment is not limited thereto, and the above embodiments may also be applicable to a scenario where the data channel in the above signal is configured as being of the first type or the network device does not configure the second type of reference signals and only configures the first type of reference signals. For example, the data channel is configured as being of the first type, and the network device configures the first type of reference signals and/or the second type of reference signals; for another example, the data channel is configured as being of the second type, and the network device configures the first type of reference signals and/or the second type of reference signals. Here, the first type is, for example, the above type A, and the second type is, for example, the above type B; however, this embodiment is not limited thereto. In the following description, unless otherwise specified, identical expressions have identical meanings, which shall not be described herein any further.

In one implementation of this embodiment, if the network device configures the second type of reference signals, for example, the network device configures one or more first type of reference signals and one or more second type of reference signals, and the data channels in the above signals are configured as being of the first type, the positions of the reference signals in the above signals may be determined according to a situation where the data channels are configured as being of the second type and the network device does not configure the second type of reference signals, or may be determined according to a situation where the data channels are configured as being of the second type and the network device configures the second type of reference signals, or may be determined according to a fixed time-domain position, or may be determined according to a situation in R15 in which the data channels are configured to be of the first type and a situation where the data channels are configured as being of the second type and the network device configures the second type of reference signals.

For example, as in a case where the data channels are configured as being of the second type and the network device does not configure the second type of reference signals, the first type of reference signals are always on a first symbol of a time-domain resource occupied by a scheduled data channel, if the network device configures the second type of reference signals and the data channel in the above signal is configured as being of the first type, the position of the reference signal in the above signal may be of a first symbol of a corresponding time-domain resource segment, that is, a first symbol of each time-domain resource segment is used for reference signal transmission.

For another example, as in a case where the data channel is configured as being of the second type and the network device configures the second type of reference signals, the position of the reference signal in the signal may be determined according to at least one of the following: a symbol length of the corresponding time-domain resource segment, time-domain resource allocation (TDRA) configuration or indication of the corresponding time-domain resource segment, higher layer signaling configuration, and a provision in a specification. Thus, if the network device configures the second type of reference signals and the data channel in the above signal is configured as being of the first type, the position of the reference signal in the above signal may also be determined according to at least one of above items.

For a further example, if the network device configures the second type of reference signals and the data channel in the above signal is configured as being of the first type, the position of the reference signal in the above signal may be of a fixed time-domain position, such as a first symbol of a corresponding time-domain resource segment, or a second symbol of the corresponding time-domain resource segment, or a position of a reference signal to which the above first type corresponds.

For still another example, if the network device configures the second type of reference signal and the data channel in the above signal is configured as being of the first type, the position of the reference signal in the above signal may be determined according to a situation in R15 where the data channel is configured as being of the first type and a situation where the data channel is configured as being of the second type and the network device configures the second type of reference signals. For example, the position of the reference signal in the signal is determined according to the situation in R15 where the data channel is configured as being of the first type, and if one or more time-domain resource segments do not contain symbols of the reference signal, the position of the reference signal in the signal to which the time-domain resource segment corresponds may be the first symbol of the corresponding time-domain resource segment, or a second symbol of the corresponding time-domain resource segment.

In another implementation of this embodiment, if the network device only configures the first type of reference signals, for example, the network device configures one or more reference signals of the first type, the position of the reference signal in the above signal may be of a fixed time-domain position, such as a first symbol of a corresponding time-domain resource segment, or a second symbol of the corresponding time-domain resource segment, or the first symbol and the second symbol of the corresponding time-domain resource segment. In this implementation, the data channel in the above signal may be configured as being of the first type or the second type, that is, regardless of whether the data channel in the above signal is configured as being of the first type or the second type, if the network device only configures the first type of reference signals, the position of the reference signal in the above signal may be the above fixed time-domain position.

In this implementation, if the network device only configures the first type of reference signals, according to an existing standard, one or some repetitions (such as a second repetition) have no reference signal. If frequency hopping is performed, it will be resulted in that there is no available reference signal for the repetition. According to the method of this implementation, the reference signal is transmitted at the fixed time-domain position (the first symbol and/or the second symbol) of the corresponding time-domain resource segment, thereby solving this problem.

For example, even if the TDRA configures or indicates that the data channel is of the first type, a second and subsequent actual repetitions may be treated as type B in R15, that is, a reference signal is transmitted at a first symbol of the time-domain resource segment occupied by each repetition. Alternatively, one or more repetitions may be treated as type B in R15, that is, a reference signal is transmitted on a first symbol of a time-domain resource segment occupied by each repetition.

In this example, when a DCI format scrambled by a C-RNTI, or a CS-RNTI, or an MCS-C-RNTI, or a new DCI format (such as DCI format 0-2, and 1-2, etc.), is used, or when higher-layer signaling configures the terminal equipment to perform PUSCH repetition in R16, even if the TDRA field in the UL grant or the PUSCH TDRA configured via RRC indicates that a type of the PUSCH is of type A, the terminal equipment expects that time-domain resource segments occupied by all repetitions or time-domain resource segments except for the time-domain resource segment occupied by the first repetition adopt the reference signal transmission mode of type B in R15. Therefore, in supporting PUSCH repetition and other services, a PUSCH TDRA table or identical PUSCH TDRA configurations is/are used, and RRC reconfiguration is not needed in supporting URLLC services.

All the above implementations are applicable to all DMRS configurations. For example, the data channel is configured as being of the first type, and the network device configures the first type of reference signals and/or the second type of reference signals; for another example, the data channel is configured as being of the second type, and the network device configures the first type of reference signals and/or the second type of reference signals.

In this embodiment, as mentioned above, the network device may also configure or indicate repetition of data channels or transport blocks, such as repetition of slot level in R15, or repetition with low latency in R16.

In this embodiment, for the network device, it may transmit a command to the terminal equipment, and configure or indicate the repetition of data channel or transport blocks via the command; and for the terminal equipment, it may receive the command, and determine the repetition configured or indicated by the network device according to the command.

In this embodiment, the network device may configure or indicate the repetition of the above data channel or transport blocks via RRC signaling only, or may configure or indicate the repetition of the above data channel or transport blocks via a combination of RRC signaling and DCI signaling, which shall be described separately below. In this embodiment, for the convenience of description, the repetition of a data channel or a transport block is briefly referred to as repetition.

In one implementation, the network device configures or indicates the above repetition only via higher-layer signaling (the above RRC signaling), the higher-layer signaling including a first parameter, the first parameter indicating the above repetition, or the first parameter indicating the above repetition and the number of repetitions.

For example, a parameter used to indicate repetition (referred to as a first parameter for short), such as pusch-AggregationFactor-r16, may be added to the RRC signaling, so as to notify the terminal equipment to perform the above repetition of low-latency and high-reliability, that is, one UL grant schedules two or more repetitions of one TB, and these two or more repetitions may be in one slot, or may be in multiple consecutive slots across slot boundaries. In addition, this parameter may also be used to notify the number of subsequent repetitions, such as 1, 2, 4, 6, 8, and so on. The number of repetitions is only a number of nominal transmissions. In actual transmission, one repetition may be split into multiple repetitions when encounter a slot boundary or an uplink-downlink (DL/UL) switching point.

The format of the above first parameter may be, for example:

pdsch-AggregationFactor-r16 ENUMERATED {nA, nB, nC . . . } OPTIONAL;

where, nA, nB and nC denote numbers of repetitions, values of which are natural numbers, and the number of configured number of repetitions is also a natural number. When pdsch-AggregationFactor-r16 is not configured, it means that the network device does not configure terminal equipment to perform repetition of low-latency and high-reliability, or the number of repetitions is 1, or that the network side may not dynamically indicate the number of nominal repetitions via DCI signaling.

In another implementation, the network device configures or indicates the above repetition via higher-layer signaling (the above RRC signaling) only. The higher-layer signaling includes a second parameter that is used to enable or disable "number of dynamic nominal repetitions", "number of dynamic nominal repetitions" being enabled means that the network device will dynamically indicate the number of nominal repetitions via a filed in the DCI signaling, and "number of dynamic nominal repetitions" being disabled means that there exists no related signaling field indicating the number of nominal repetitions in the DCI of the network device. When the "number of dynamic nominal repetitions" is enabled by the second parameter, the above repetitions are also enabled correspondingly, and when the "number of dynamic nominal repetitions" is disabled by the second parameter, the above repetitions are also disabled correspondingly.

In this implementation, a condition that the repetition is enabled or disabled may be added. For example, when the above "number of dynamic nominal repetitions" is enabled by the second parameter and the number of dynamic nominal repetitions is greater than or equal to a first value, the above repetitions are enabled, and when the above "number of dynamic nominal repetitions" is disabled by the second parameter, or the "number of dynamic nominal repetitions" is enabled by the second parameter but the number of dynamic nominal repetitions is less than or equal to a second value, the above repetitions are disabled.

In this implementation, the above "number of dynamic nominal repetitions" may be indicated via DCI signaling, and enabling or disabling of the field is realized via the above second parameter.

For example, when the indication of the "number of dynamic nominal repetitions" is configured as being enabled by the above second parameter, the repetitions are also enabled at the same time; on the contrary, when the indication of the "number of dynamic nominal repetitions" is configured as being disabled by the above second parameter, the repetitions are also disabled at the same time.

For another example, when the indication of the "number of dynamic nominal repetitions" is configured as being enabled by the above second parameter and the number of candidate nominal repetitions is greater than or equal to a first value (such as 0, 1, and 2, etc.), the repetitions are also enabled at the same time; on the contrary, when the indication of the "number of dynamic nominal repetitions" is configured as being disabled by the above second parameter, or is configured as being disabled by the above second parameter and the number of candidate nominal repetitions is less than or equal to a second value (such as 0,1, and 2, etc.), the repetitions are also disabled at the same time.

In this implementation, whether the above repetition is configured or indicated may be determined according to whether the time-domain resource allocation configured via the higher-layer signaling includes the number of repetitions. For example, a time-domain resource allocation related parameter is PUSCH-TimeDomainResourceAllocation-16', and if the parameter contains a parameter of the number of repetitions, it means that the repetition is configured; otherwise it means that the repetition is not configured.

In another implementation, the network device configures or indicates the above repetition via higher-layer signaling and downlink control information, the higher-layer signaling including a third parameter, the third parameter configuring or indicating the above repetition, and the downlink control information including an indication field, the indication field indicating whether to enable the above repetition.

In this implementation, the above indication field may be any one of the following or a combination thereof, that is, the indication field includes at least one of the following:

a DCI field used for indicating the number of nominal repetitions;

a DCI field used for indicating time-domain resource allocation;

an information field used for indicating a mode of repetition and/or the number of nominal repetitions; and an information field used for indicating the number of nominal repetitions and/or a mode of time-domain resource allocation.

For the above DCI field used to indicate the number of nominal repetitions, for example, it may be a separate DCI field, which is only used to indicate the number of nominal repetitions. When the above higher-layer signaling indicates that the DCI field is enabled and the DCI field indicates that the number of repetitions is greater than or equal to a value (such as 0, 1, and 2, etc.), the terminal equipment is indicated to perform repetition. The separate DCI field may be of 1 bit or 2 bits, and the number of nominal repetitions may be a value configured by the higher-layer signaling. The higher-layer signaling may be RRC signaling, or RRC signaling and MAC-CE signaling, that is, the RRC signaling configures one or more candidate values of the number of one or more repetitions, and the MAC-CE signaling selects one or more values therefrom.

For the above DCI field used to indicate the time-domain resource allocation, for example, when the DCI field indicates that S+L>14, it means that the terminal equipment is notified to perform repetition.

For the above information field used to indicate the mode of the repetition and/or the number of nominal repetitions, for example, slot-level repetition is supported in R15, and repetition of low-latency and high-reliability is contained in R16 (referred to as R16 repetition). In this implementation, an information field is used to denote the indication of dynamic switching and/or the number of repetitions in R15 and R16 repetition.

In this implementation, an information field of 1 bit or 2 bits or 3 bits or other bit values may be used to indicate the mode of repetition and/or the number of nominal repetitions. For example, different bit values of the information field indicate different modes of repetition, or indicate different modes of repetition and the number of repetitions.

For example, the information field may be of 2 bits, and different bit values are used to indicate different modes of repetition and/or the number of nominal repetitions, as shown in Table 1 below:

TABLE 1

| Information field | Indicated meanings |
|---|---|
| '00' | R15 repetition |
| '01' | R16 repetition, and the number of nominal repetitions is 1 configured by the higher-layer signaling |
| '10' | R16 repetition, and the number of nominal repetitions is 2 configured by the higher-layer signaling |
| '11' | R16 repetition, and the number of nominal repetitions is 3 configured by the higher-layer signaling |

That is, when the bit value of the information field is '00', it indicates 'R15 repetition'; when the bit value of the information field is '01', it indicates 'R16 repetition, and the number of nominal repetitions is 1 configured by the higher-layer signaling'; when the bit value of the information field is '10', it indicates 'R16 repetition, and the number of nominal repetitions is 2 configured by the higher layer signaling'; and when the bit value of the information field is '11', it indicates 'R16 repetition, and the number of nominal repetitions is 3 configured by the higher layer signaling'. The above values of the number of nominal repetitions are illustrative only, and a correspondence relationship between the information field bits of the DCI field and the indicated meanings is also illustrative. In addition, the above higher-layer signaling may be RRC signaling, or may be RRC signaling and MAC-CE signaling, that is, the RRC signaling configures one or more candidate values of the above number of repetitions, and the MAC-CE signaling selects one or more values therefrom.

For another example, the information field may be of 1 bit, and different bit values thereof are used to indicate different modes of repetition and/or the number of nominal repetitions, as shown in Table 2 below:

TABLE 2

| Information field | Indicated meanings |
|---|---|
| '0' | R15 repetition |
| '1' | R16 repetition, and the number of nominal repetitions is the number configured by the higher-layer signaling |

That is, when the bit value of the information field is '0', it indicates 'R15 repetition'; when the bit value of the information field is '1', it indicates 'R16 repetition, and the number of nominal repetitions is the number configured by the higher-layer signaling'. The above values of the number of nominal repetitions are illustrative only, and a correspondence relationship between the information field bits of the DCI field and the indicated meanings is also illustrative. In addition, the above higher-layer signaling may be RRC signaling, or may be RRC signaling and MAC-CE signaling, that is, the RRC signaling configures one or more candidate values of the above number of repetitions, and the MAC-CE signaling selects one or more values therefrom.

For a further example, the information field may be of 2 bits, different bit values thereof are used to indicate different modes of repetition and/or the number of repetitions, and the number of repetitions may be nominal, as shown in Table 3 below:

TABLE 3

| Information field | Indicated meanings |
|---|---|
| '00' | R15 repetition, and the number of repetitions is value 1 configured by the higher-layer signaling |
| '01' | R15 repetition, and the number of repetitions is value 2 configured by the higher-layer signaling |
| '10' | R16 repetition, and the number of repetitions is value 1 configured by the higher-layer signaling |
| '11' | R16 repetition, and the number of repetitions is value 2 configured by the higher-layer signaling |

That is, when the bit value of the information field is '00', it indicates 'R15 repetition, and the number of repetitions is value 1 configured by the higher-layer signaling'; when the bit value of the information field is '01', it indicates 'R15 repetition, and the number of repetitions is value 2 configured by the higher-layer signaling'; when the bit value of the information field is '10', it indicates 'R16 repetition, and the number of nominal repetitions is value 1 configured by the higher layer signaling'; and when the bit value of the information field is '11', it indicates 'R16 repetition, and the number of nominal repetitions is value 2 configured by the higher layer signaling'. The above values of the number of nominal repetitions are illustrative only, a correspondence relationship between the information field bits of the DCI field and the indicated meanings is also illustrative, and the number of bits of information field for indicating the R15 repetition or the R16 repetition is also illustrative. In addition, the above higher-layer signaling may be RRC signaling, or may be RRC signaling and MAC-CE signaling, that is, the RRC signaling configures one or more candidate values of the above number of repetitions, and the MAC-CE signaling selects one or more values therefrom. The higher-layer signaling configuration of R15 repetition and R16 repetition may be of the same parameter, or may be of different parameters, which are not limited in this embodiment.

For still another example, the information field may be of 3 bits, different bit values thereof are used to indicate different modes of repetition and/or the number of repetitions, and the number of repetitions may be nominal, as shown in Table 4 below:

TABLE 4

| Information field | Indicated meanings |
|---|---|
| '000' | R15 repetition, and the number of repetitions is value 1 configured by the higher-layer signaling |
| '001' | R15 repetition, and the number of repetitions is value 2 configured by the higher-layer signaling |
| '010' | R16 repetition, and the number of nominal repetitions is value 1 configured by the higher-layer signaling |
| '011' | R16 repetition, and the number of nominal repetitions is value 2 configured by the higher-layer signaling |
| '100' | R16 repetition, and the number of nominal repetitions is value 3 configured by the higher-layer signaling |

TABLE 4-continued

| Information field | Indicated meanings |
|---|---|
| '101' | R16 repetition, and the number of nominal repetitions is value 4 configured by the higher-layer signaling |
| '110' | R16 repetition, and the number of nominal repetitions is value 5 configured by the higher-layer signaling |
| '111' | R16 repetition, and the number of nominal repetitions is value 6 configured by the higher-layer signaling |

That is, when the bit value of the information field is '000', it indicates 'R15 repetition, and the number of repetitions is value 1 configured by the higher-layer signaling'; when the bit value of the information field is '001', it indicates 'R15 repetition, and the number of repetitions is value 2 configured by the higher-layer signaling'; when the bit value of the information field is '010', it indicates 'R16 repetition, and the number of nominal repetitions is value 1 configured by the higher layer signaling'; when the bit value of the information field is '011', it indicates 'R16 repetition, and the number of nominal repetitions is value 2 configured by the higher layer signaling'; when the bit value of the information field is '100', it indicates 'R16 repetition, and the number of nominal repetitions is value 3 configured by the higher layer signaling'; when the bit value of the information field is '101', it indicates 'R16 repetition, and the number of nominal repetitions is value 4 configured by the higher layer signaling'; when the bit value of the information field is '110', it indicates 'R16 repetition, and the number of nominal repetitions is value 5 configured by the higher layer signaling'; and when the bit value of the information field is '111', it indicates 'R16 repetition, and the number of nominal repetitions is value 6 configured by the higher layer signaling'. The above values of the number of nominal repetitions are illustrative only, a correspondence relationship between the information field bits of the DCI field and the indicated meanings is also illustrative, and the number of bits of information fields used for indicating R15 repetition or R16 repetition is also illustrative. For example, the number of bits of information fields used for R15 and R16 repetitions related indication may also be 1 and 7, 3 and 5, 4 and 4, 5 and 3, 6 and 2, and 7 and 1. In addition, the above higher-layer signaling may be RRC signaling, or may be RRC signaling and MAC-CE signaling, that is, the RRC signaling configures one or more candidate values of the above number of repetitions, and the MAC-CE signaling selects one or more values therefrom. The higher-layer signaling configuration of R15 repetition and R16 repetition may be of the same parameter, or may be of different parameters, which are not limited in this embodiment.

For the above information field used to indicate the number of nominal repetitions and/or the mode of time-domain resource allocation, for example, it may be joint encoding of the number of nominal repetitions and the TDRA field. When the number of nominal repetitions is greater than or equal to a value (such as 0, 1, and 2, etc.) and the TDRA field indicates a mode of resource allocation (such as S+L>14), it indicates notifying the terminal equipment to perform repetition.

In another implementation, the network device configures or indicates the above repetition via higher-layer signaling and downlink control information. The higher-layer signaling includes a fourth parameter, the fourth parameter configuring or indicating the above repetition, and a format of the downlink control information being associated with whether to enable the repetition.

For example, when the terminal equipment detects a DCI format, the DCI format is used to indicate the terminal equipment to perform URLLC-related transmissions, and the terminal equipment is indicated to perform repetition via configured higher-layer signaling and the detected DCI format and/or a specific DCI signaling field.

In this embodiment, description is given by taking that "the network device configures or indicates" as an example only. In particular implementation, "the network device configures or indicates" may be that the network device transmits configuration information or indication information to the terminal equipment to perform the above configuration or indication on the terminal equipment, and may also be that the terminal equipment receives the configuration information or indication information transmitted by the network device to obtain the above configuration or indication from the network device.

According to the embodiment of this disclosure, understandings of the transmission of the reference signals by both the network device and the terminal equipment are consistent, and reliability of the transmission of the reference signals is ensured.

Embodiment 2

The embodiment of this disclosure provides a method for configuring the number of repetitions, applicable to a network device. FIG. 5 is a schematic diagram of the method for configuring the number of repetitions of this embodiment. Referring to FIG. 5, the method includes:

step 501: a network device configures time-domain resource allocation information, the time-domain resource allocation information not containing a data channel type, or the time-domain resource allocation information containing the number of nominal repetitions, or the time-domain resource allocation information containing joint encoding of a data channel type and the number of nominal repetitions; and step 502: the network device transmits the time-domain resource allocation information.

In this embodiment, the above time-domain resource allocation information may be configured via RRC signaling. However, this embodiment is not limited thereto, and it may also be configured via other higher-layer signaling.

In this embodiment, in some cases, when the data channels are configured as being of the first type and the second type, transmission modes of the reference signals are identical. In this embodiment, the network device may not indicate a data channel type in the TDRA field, but add an indication of the number of nominal repetitions, or add joint encoding of the data channel type and the number of nominal repetitions.

For example, in R15, an example of a TDRA indication is Table 6.1.2.1.1-2, which is as follows:

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

In this embodiment, PUSCH mapping type' in the second column may be removed and replaced with a value of the number of nominal repetitions configured by higher-layer signaling, the above first type (i.e. type A) may be removed and replaced with a value of the number of nominal repetitions configured by higher-layer signaling, the above second type (i.e. type B) may be removed and replaced with a value of the number of nominal repetitions configured by higher-layer signaling, and the second column may be modified into a joint indication of 'the data channel type and the number of nominal repetitions', as shown in Table 5 and Table 6 below.

TABLE 5

| Row index | number of Nominal repetitions | $K_2$ | S | L |
|---|---|---|---|---|
| 1 | Value A | j | 0 | 14 |
| 2 | Value A | j | 0 | 12 |
| 3 | Value A | j | 0 | 10 |
| 4 | Value B | j | 2 | 10 |
| 5 | Value B | j | 4 | 10 |
| 6 | Value B | j | 4 | 8 |
| 7 | Value B | j | 4 | 6 |

TABLE 5-continued

| Row index | number of Nominal repetitions | $K_2$ | S | L |
|---|---|---|---|---|
| 8 | Value A | j + 1 | 0 | 14 |
| 9 | Value A | j + 1 | 0 | 12 |
| 10 | Value A | j + 1 | 0 | 10 |
| 11 | Value C | j + 2 | 0 | 14 |
| 12 | Value C | j + 2 | 0 | 12 |
| 13 | Value C | j + 2 | 0 | 10 |
| 14 | Value D | j | 8 | 6 |
| 15 | Value D | j + 3 | 0 | 14 |
| 16 | Value D | j + 3 | 0 | 10 |

TABLE 6

| Row index | PUSCH mapping type and number of nominal repetitions | $K_2$ | S | L |
|---|---|---|---|---|
| 1 | Type A, value A | j | 0 | 14 |
| 2 | Type A, value A | j | 0 | 12 |
| 3 | Type A, value A | j | 0 | 10 |
| 4 | Type B, value B | j | 2 | 10 |
| 5 | Type B, value B | j | 4 | 10 |
| 6 | Type B, value B | j | 4 | 8 |
| 7 | Type B, value B | j | 4 | 6 |
| 8 | Type A, value C | j + 1 | 0 | 14 |
| 9 | Type A, value C | j + 1 | 0 | 12 |
| 10 | Type A, value C | j + 1 | 0 | 10 |
| 11 | Type A, value A | j + 2 | 0 | 14 |
| 12 | Type A, value A | j + 2 | 0 | 12 |
| 13 | Type A, value A | j + 2 | 0 | 10 |
| 14 | Type B, value D | j | 8 | 6 |
| 15 | Type A, value D | j + 3 | 0 | 14 |
| 16 | Type A, value D | j + 3 | 0 | 10 |

The above values A, B, C, and D are all illustrative, and are natural numbers.

The modified table and the above Table 6.1.2.1.1-2 may coexist, when the higher-layer signaling configures to perform repetitions of data channel, the modified table takes effect, and when higher-layer signaling does not configure to perform repetitions of data channel, the above Table 6.1.2.1.1-2 takes effect.

In this embodiment, the TDRA may be configured by the higher-layer signaling, such as time-domain resource allocation sinalin in R15, which is as shown below:

```
PUSCH-TimeDomainResourceAllocation ::= SEQUENCE {
    k2                      INTEGER(0..32)        OPTIONAL, --Need
  S
    mappingType             ENUMERATED {typeA, typeB},
    startSymbolAndLength    INTEGER (0..127)
}.
```

Then in R16, the configuration of number of nominal repetition 'nrofrepetition' may be added into the TDRA, which is as shown below:

```
PUSCH-TimeDomainResourceAllocation ::= SEQUENCE {
    k2                      INTEGER(0..32)        OPTIONAL, --Need
  S
    mappingType             ENUMERATED {typeA, typeB},
    nrofrepetition          INTEGER (0..8)         OPTIONAL
    startSymbolAndLength    INTEGER (0..127)
}.
```

In the above example, 'PUSCH-TimeDomainResourceAllocation' may also be a newly-added parameter with the same function in R16, such as 'PUSCH-TimeDomainResourceAllocation-16', and so on. In this example, a configurable value of the number of nominal repetitions 'nrofrepetition' is illustrative only, and a configuration of 'mappingType' may be removed from 'PUSCH-TimeDomainResourceAllocation-16'.

With the method of this embodiment, the joint encoding of the TDRA and the number of repetitions is realized.

Embodiment 3

The embodiment of this disclosure provides a method for indicating repetitions, applicable to a network device. FIG. 6 is a schematic diagram of the method for indicating repetitions of this embodiment. Referring to FIG. 6, the method includes:

step 601: a network device generates downlink control information, the downlink control information including an information field, the information field being used for indicating a mode of repetitions or indicating a mode of repetitions and the number of nominal repetitions or indicating time-domain resource allocation and number of nominal repetitions; and step 602: the network device transmits the downlink control information.

In this embodiment, the above information field is of, for example, 1 bit or 2 bits or 3 bits or other bits, different bit values may indicate different modes of repetitions, or indicate different modes of repetitions and corresponding number of repetitions, and reference may be made to Table 1 to Table 4 of Embodiment 1 for details, which shall not be described herein any further.

In addition, in this embodiment, different bit values of the above information field may also indicate different modes of time-domain resource allocation and modes of repetitions, such as the examples of Table 5 to Table 6 in Embodiment 2, which shall not be described herein any further. Thus, joint encoding of the TDRA and the number of repetitions is realized.

According to the embodiment of this disclosure, the mode of repetitions may be indicated via the downlink control information, the number of repetitions may further be indicated, and the terminal equipment may determine the position of the reference signal in the transmitted signal accordingly, which has been described in Embodiment 1, and shall not be described herein any further. And the network device may further determine the position of the reference signal in the transmitted signal accordingly, so that the network device and the terminal equipment have a consistent understanding for the transmission of the reference signal, and the reliability of the transmission of the reference signal is ensured.

Embodiment 4

The embodiment of this disclosure provides an apparatus for transmitting a reference signal, configured in a transmitter end, such as a terminal equipment, or a network device. As principles of the apparatus for solving problems are similar to that of the method of Embodiment 1, reference may be made to the implementation of the method in Embodiment 1 for implementation of this apparatus, with identical parts being not going to be described herein any further.

FIG. 7 is a schematic diagram of the apparatus for transmitting a reference signal of this embodiment. In this embodiment, the apparatus for transmitting a reference signal is configured in a terminal equipment. As shown in FIG. 7, the apparatus for transmitting a reference signal 700 includes a generating unit 701 and a transmitting unit 702. The generating unit 701 generates one or more signals corresponding to the same transport block, the one or more signals including a data channel and a reference signal, and the transmitting unit 702 transmits the one or more signals in one or more time-domain resource segments, positions of reference signals in the one or more signals being determined based on the one or more time-domain resource segments.

In this embodiment, the transmitting unit 701 may transmit a first signal in a first time-domain resource segment, and transmit a second signal in a second time-domain resource segment, the first signal and the second signal corresponding to the same transport block, and the first signal and the second signal including a data channel and a reference signal, respectively, a position of the reference signal in the first signal being determined based on the first time-domain resource segment, and a position of the reference signal in the second signal being determined based on the second time-domain resource segment.

In this embodiment, the transmitting unit 701 may further transmit a third signal in a third time-domain resource segment, the third signal corresponding to the transport block and including a data channel and a reference signal, a position of the reference signal in the third signal being determined based on the third time-domain resource segment. In this example, the number of the third time-domain resource segment may be one or more, and correspondingly, the number of the third signal may be one or more.

In this embodiment, the positions of reference signal in the one or more signals may be determined based on at least one of the following:

a symbol length of the time-domain resource segment;

time-domain resource allocation (TDRA) configuration or indication of the time-domain resource segment;

higher layer signaling configuration; and a provision in a specification.

In one implementation, the network device does not configure a second type of reference signal; or, the network device configures one or more second type of reference signals, and the transmitting unit 701 assumes that the network device does not configure the second type of reference signal, and the position of the reference signal in the one or more signals is determined based on the provision in a specification.

In one implementation, the network device configures one or more first type of reference signals and one or more second type of reference signals and the data channel in the signal is configured as being of a first type, and the position of the reference signal in the signal is a first symbol of a corresponding time-domain resource segment.

In one implementation, the network device configures one or more first type of reference signals and one or more second type of reference signals and the data channel in the signal is configured as being of a first type, and the position of the reference signal in the signal is a position determined according to at least one of the following: a symbol length of a corresponding time-domain resource segment, time-domain resource allocation configuration or indication of the corresponding time-domain resource segment, higher layer signaling configuration, and a provision in a specification.

In one implementation, the network device configures one or more first type of reference signals and one or more second type of reference signals, the data channel in the signal is configured as being of a first type, and the position of the reference signal in the signal is at least one of the following: a first symbol of a corresponding time-domain resource segment, a second symbol of the corresponding time-domain resource segment, and a reference signal position to which the first type corresponds.

In one implementation, the network device configures one or more first type of reference signals, the data channel in the signal is configured as being of a first type or a second type, and the position of the reference signal in the signal is a first symbol and/or a second symbol of a corresponding time-domain resource segment.

In this embodiment, as shown in FIG. 7, the apparatus for transmitting a reference signal 700 further includes:

a receiving unit 703 configured to receive a command transmitted by the network device, the command configuring or indicating repetition of a data channel or a transport block. And furthermore, the receiving unit 703 may receive other configuration information transmitted by the network device, which is as described above, and shall not be described herein any further.

In one implementation, the network device configures or indicates the repetition of the above transport block via higher-layer signaling only, the higher-layer signaling including a first parameter, the first parameter indicating the repetition of the above transport block, or the first parameter indicating the repetition of the above transmission block and the number of repetitions.

In one implementation, the network device configures or indicates the repetition of the above transmission block via higher-layer signaling only, the higher-layer signaling including a second parameter, the second parameter enabling or disabling the number of dynamic nominal repetitions. When the number of dynamic nominal repetitions is enabled by the second parameter, the repetition of the transport block is enabled, and when the number of dynamic nominal repetitions is disabled by the second parameter, the repetition of the transport block is disabled.

In this implementation, it may also be that when the number of dynamic nominal repetitions is enabled by the second parameter and the number of dynamic nominal repetitions is greater than or equal to a first value, the repetition of the transport block is enabled, and when the number of dynamic nominal repetitions is disabled by the second parameter, or when the number of dynamic nominal repetitions is enabled by the second parameter but the number of dynamic nominal repetitions is less than or equal to a second value, the repetition of the transport block is disabled.

In one implementation, the network device configures or indicates the repetition of the above transport block via higher-layer signaling and downlink control information, the higher-layer signaling including a third parameter, the third parameter configuring or indicating the repetition of the above transport block, and the downlink control information including an indication field, the indication field indicating whether to enable the above repetition.

In this implementation, the indication field includes at least one of the following: a DCI field used for indicating the number of nominal repetitions; a DCI field used for indicating time-domain resource allocation; an information field used for indicating a mode of repetition and/or the number of nominal repetitions; and an information field used for indicating the number of nominal repetitions and/or a mode of time-domain resource allocation.

In one implementation, the network device configures or indicates the repetition of the above transport block via higher-layer signaling and downlink control information, the higher-layer signaling including a fourth parameter, the fourth parameter configuring or indicating the repetition of the above transport block, and a format of the above downlink control information being associated with whether to enable the above repetition.

FIG. 8 is another schematic diagram of the apparatus for transmitting a reference signal of this embodiment. In this embodiment, the apparatus for transmitting a reference signal is configured in a network device. As shown in FIG. 8, the apparatus for transmitting a reference signal 800 includes: a generating unit 801 and a transmitting unit 802, implementations of the generating unit 801 and the transmitting unit 802 being identical to those of the generating unit 701 and transmitting unit 702 of the apparatus for transmitting a reference signal 700 shown in FIG. 7, and being not going to be described herein any further.

As shown in FIG. 8, the apparatus for transmitting a reference signal 800 further includes:

a configuring unit 803 configured to transmit a command to a terminal equipment, and configure or indicate repetition of a data channel or a transport block via the command.

In this embodiment, a mode for configuring the above repetition has been described in detail in the description of the apparatus for transmitting a reference signal 700 shown in FIG. 7, the contents of which being incorporated herein, and being not going to be described herein any further.

In this embodiment, the transmitting unit 802 may further transmit other configuration information to the terminal equipment, which is as described above, and shall not be described herein any further.

According to the embodiment of this disclosure, understandings of the transmission of the reference signals by both the network device and the terminal equipment are consistent, and reliability of the transmission of the reference signals may be ensured.

Embodiment 5

The embodiment of this disclosure provides an apparatus for configuring the number of repetition, configured in a network device. As principles of the apparatus for solving problems are similar to that of the method of Embodiment 2, reference may be made to the implementation of the method in Embodiment 2 for implementation of this apparatus, with identical parts being not going to be described herein any further.

Figure 9:
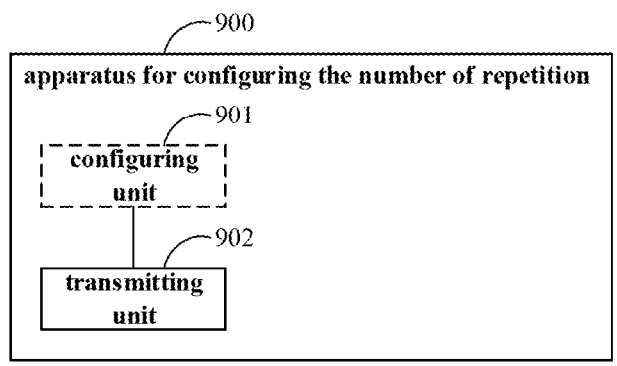
FIG. 9 is a schematic diagram of the apparatus for configuring number of repetitions of Embodiment 5.

FIG. 9 is a schematic diagram of the apparatus for configuring number of repetition of this embodiment. As shown in FIG. 9, the apparatus 900 includes: a configuring unit 901 and a transmitting unit 902. The configuring unit 901 configures time-domain resource allocation information, the time-domain resource allocation information not containing a data channel type, or the time-domain resource allocation information containing the number of nominal repetitions, or the time-domain resource allocation information containing joint encoding of a data channel type and the number of nominal repetitions; and the transmitting unit 902 transmits the time-domain resource allocation information.

With the apparatus of this embodiment, the joint encoding of the TDRA and the number of repetitions is realized.

Embodiment 6

The embodiment of this disclosure provides an apparatus for indicating repetition, configured in a network device. As principles of the apparatus for solving problems are similar to that of the method of Embodiment 3, reference may be made to the implementation of the method in Embodiment 3 for implementation of this apparatus, with identical parts being not going to be described herein any further.

Figure 10:
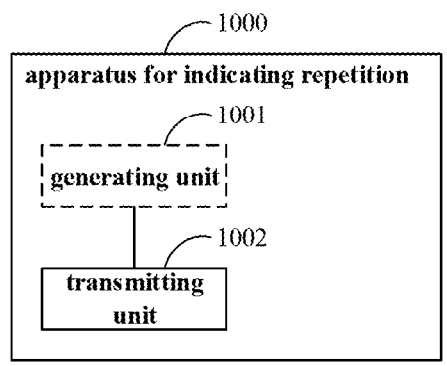
FIG. 10 is a schematic diagram of the apparatus for indicating a repetition of Embodiment 6.

FIG. 10 is a schematic diagram of the apparatus for indicating repetition of this embodiment. As shown in FIG. 10, the apparatus 1000 includes: a generating unit 1001 and a transmitting unit 1002. The generating unit 1001 generates downlink control information, the downlink control information including an information field, the information field being used for indicating a mode of repetition or indicating a mode of repetition and the corresponding number of nominal repetitions, or indicating time-domain resource allocation and the number of nominal repetitions; and the transmitting unit 1002 transmits the downlink control information.

In this embodiment, the information field may be of 1 bit or 2 bits or 3 bits or other bits, the bit values may indicate modes of repetition, or indicate modes of repetition and the number of repetitions, referring to the examples in Table 1 to Table 4 in Embodiment 1 for details, or indicate time-domain resource allocation and the number of repetitions, referring to the examples in Table 5 and Table 6 in Embodiment 2 for details.

According to the embodiment of this disclosure, understandings of the transmission of the reference signals by both the network device and the terminal equipment are consistent, and reliability of the transmission of the reference signals is ensured.

Embodiment 7

The embodiment of this disclosure provides a terminal equipment, including the apparatus described in Embodiment 4.

Figure 11:
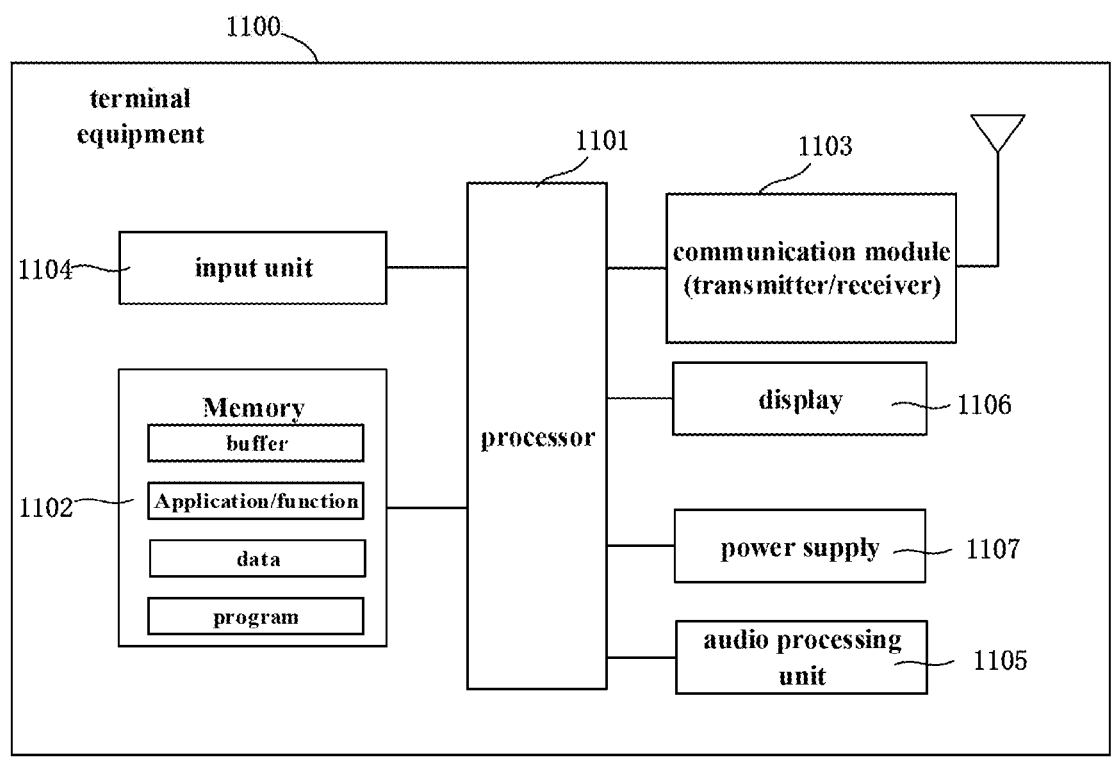
FIG. 11 is a schematic diagram of the terminal equipment of Embodiment 7.

FIG. 11 is a schematic diagram of the terminal equipment of the embodiment of this disclosure. As shown in FIG. 11, the terminal equipment 1100 may include a central processing unit 1101 and a memory 1102, the memory 1102 being coupled to the central processing unit 1101. It should be noted that this figure is illustrative only, and other types of structures may also be used, so as to supplement or replace this structure and achieve a telecommunications function or other functions.

In one implementation, the functions of the apparatus described in Embodiment 4 may be integrated into the central processing unit 1101, and the central processing unit 1101 executes functions of the apparatus described in Embodiment 4. The functions of the apparatus described in Embodiment 4 are incorporated herein, and shall not be described herein any further.

In another implementation, the apparatus described in Embodiment 4 and the central processing unit 1101 may be configured separately; for example, the apparatus described in Embodiment 4 may be configured as a chip connected to the central processing unit 1101, and the functions of the apparatus described in Embodiment 4 are executed under control of the central processing unit 1101.

As shown in FIG. 11, the terminal equipment 1100 may further include a communication module 1103, an input unit 1104, an audio processing unit 1105, a display 1106 and a power supply 1107. It should be noted that the terminal equipment 1100 does not necessarily include all the parts shown in FIG. 11. Furthermore, the terminal equipment 1100 may include parts not shown in FIG. 11, and the related art may be referred to.

As shown in FIG. 11, the central processing unit 1101 is sometimes referred to as a controller or an operational control, which may include a microprocessor or other processor devices and/or logic devices. The central processing unit 1101 receives input and controls operations of components of the terminal equipment 1100.

The memory 1102 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 1101 may execute programs stored in the memory 1102, so as to realize information storage or processing, etc. Functions of other parts are similar to those of the related art, which shall not be described herein any further. The parts of the terminal equipment 1100 may be realized by specific hardware, firmware, software, or any combination thereof, without departing from the scope of this disclosure.

With the terminal equipment of this embodiment, understandings of the transmission of the reference signals by both the network device and the terminal equipment are consistent, and reliability of the transmission of the reference signals is ensured.

Embodiment 8

The embodiment of this disclosure provides a network device, including the apparatus described in Embodiment 5 or 6.

Figure 12:
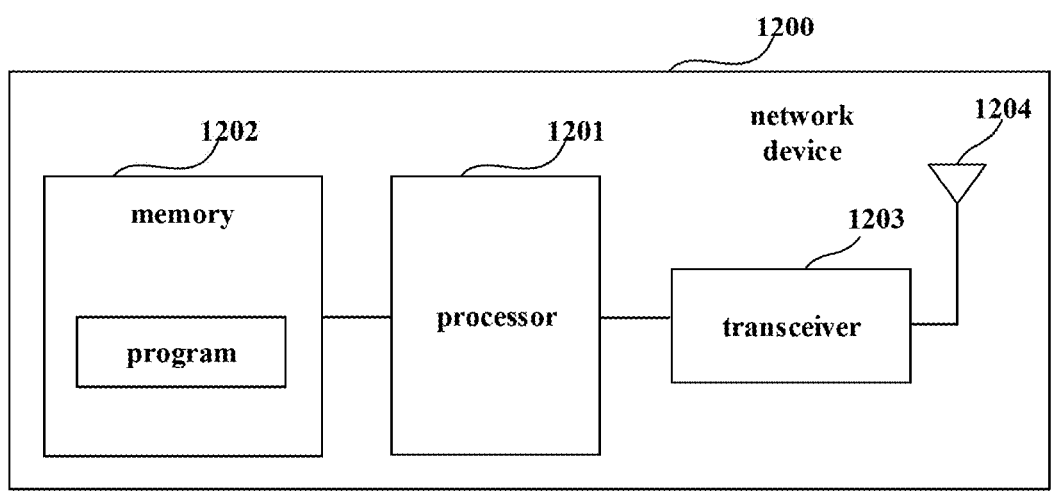
FIG. 12 is a schematic diagram of the network device of Embodiment 8.

FIG. 12 is a schematic diagram of a structure of one implementation of the network device of the embodiment of this disclosure. As shown in FIG. 12, the network device 1200 may include a central processing unit (CPU) 1201 and a memory 1202, the memory 1202 being coupled to the central processing unit 1201. The memory 1202 may store various data, and furthermore, it may store a program for data processing, and execute the program under control of the central processing unit 1201, so as to receive various information transmitted by a terminal equipment, and transmit various information to the terminal equipment.

In one implementation, the functions of the apparatus described in Embodiment 5 or 6 may be integrated into the central processing unit 1201, and the central processing unit 1201 executes functions of the apparatus described in Embodiment 5 or 6. The functions of the apparatus described in Embodiment 5 or 6 are incorporated herein, and shall not be described herein any further.

In another implementation, the apparatus described in Embodiment 5 or 6 and the central processing unit 1201 may be configured separately; for example, the apparatus described in Embodiment 5 or 6 may be configured as a chip connected to the central processing unit 1201, and the functions of the apparatus described in Embodiment 5 or 6 are executed under control of the central processing unit 1201.

Furthermore, as shown in FIG. 12, the network device 1200 may include a transceiver 1203, and an antenna 1204, etc. Functions of the above components are similar to those in the related art, and shall not be described herein any further. It should be noted that the network device 1200 does not necessarily include all the parts shown in FIG. 12. Furthermore, the network device 1200 may include parts not shown in FIG. 12, and the related art may be referred to.

With the network device of this embodiment, understandings of the transmission of the reference signals by both the network device and the terminal equipment are consistent, and reliability of the transmission of the reference signals is ensured.

Embodiment 9

The embodiment of this disclosure provides a communication system, including a network device and a terminal equipment. The network device is, for example, the network device 1200 described in Embodiment 8, and the terminal equipment is, for example, the terminal equipment 1100 described in Embodiment 7.

In this embodiment, the terminal equipment is, for example, a UE served by a gNB, and may include conventional compositions and functions of a terminal equipment in addition to the functions of the apparatus described in Embodiment 4, which are as described in Embodiment 7, and shall not be described herein any further.

In this embodiment, the network device may be, for example, a gNB in NR, and may include conventional compositions and functions of a network device in addition to the functions of the apparatus described in Embodiment 5 or 6, which are as described in Embodiment 8, and shall not be described herein any further.

With the communication system of this embodiment, understandings of the transmission of the reference signals by both the network device and the terminal equipment are consistent, and reliability of the transmission of the reference signals is ensured.

An embodiment of this disclosure provides a computer readable program, which, when executed in a terminal equipment, will cause a computer to carry out the method described in Embodiment 1 in the terminal equipment.

An embodiment of this disclosure provides a storage medium storing a computer readable program, which will cause a computer to carry out the method described in Embodiment 1 in a terminal equipment.

An embodiment of this disclosure provides a computer readable program, which, when executed in a network device, will cause a computer to carry out the method described in Embodiment 1 or 2 or 3 in the network device.

An embodiment of this disclosure provides a storage medium storing a computer readable program, which will cause a computer to carry out the method described in Embodiment 1 or 2 or 3 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to the implementations disclosed in the embodiments, following supplements are further disclosed.

1. An apparatus for indicating repetition, configured in a network device, the apparatus including:

a generating unit configured to generate downlink control information, the downlink control information including an information field, the information field being used for indicating a mode of repetition or indicating a mode of repetition and the corresponding number of nominal repetitions, or indicating time-domain resource allocation and the number of nominal repetitions; and a transmitting unit configured to transmit the downlink control information.

2. The apparatus according to supplement 1, wherein the information field is of 1 bit or 2 bits or 3 bits, different bits indicating different modes of repetition, or indicating different modes of repetition and the number of nominal repetitions, or indicating different time-domain resource allocation and the number of nominal repetitions.

What is claimed is:

1. An apparatus for transmitting a reference signal, configured in a terminal equipment, the apparatus comprising:
processor circuitry configured to generate one or more actual repetitions corresponding to the same transport block, each of the one or more actua repetitions comprising a data channel and a reference signal;

a transmitter configured to transmit the one or more actual repetitions in one or more time-domain resource segments in which the one or more actual repetitions are located, positions of reference signals in the one or more actual repetitions being determined based on the one or more time-domain resource segments in which the one or more actual repetitions are located; and a receiver configured to, before the transmitter transmits the signal, receive a command transmitted by a network device, the command configuring or indicating repetition of a data channel or a transport block, wherein the command configuring or indicating repetition of a data channel or a transport block comprises: configuring or indicating the repetition of the transport block by the network device via higher layer signaling and downlink control information, the higher layer signaling comprising a third parameter, the third parameter configuring or indicating the repetition of the transport block, and the downlink control information comprising an indication field, the indication field indicating whether to enable the repetition, and the indication field indicating dynamic switching between a first repetition which is a petition of slot level and a second repetition which is a repetition of symbol level.

2. The apparatus according to claim 1, wherein,
the transmitter transmits a first signal in a first time-domain resource segment, and transmits a second signal in a second time-domain resource segment, the first signal and the second signal corresponding to the same transport block, and the first signal and the second signal comprising a data channel and a reference signal, respectively, a position of the reference signal in the first signal being determined based on the first time-domain resource segment, and a position of the reference signal in the second signal being determined based on the second time-domain resource segment.

3. The apparatus according to claim 2, wherein,
the transmitter transmits a third signal in a third time-domain resource segment, the third signal corresponding to the transport block and comprising a data channel and a reference signal, a position of the reference signal in the third signal being determined based on the third time-domain resource segment;
wherein the number of the third time-domain resource segment is one or more, and correspondingly, the number of the third signal is one or more.

4. The apparatus according to claim 1, wherein the being determined based on the one or more time-domain resource segments refers to being determined based on at least one of the following:
a symbol length of the time-domain resource segment;
time-domain resource allocation (TDRA) configuration or indication of the time-domain resource segment;
higher layer signaling configuration; and
a provision in a specification.

5. The apparatus according to claim 4, wherein the network device does not configure a second type of reference signal; or, the network device configures one or more second type of reference signals, the transmitter assumes that the network device does not configure the second type of reference signal, and the position of the reference signal in the one or more actual repetitions is determined based on the provision in a specification.

6. The apparatus according to claim 1, wherein the network device configures one or more first type of reference signals and one or more second type of reference signals, the data channel in the signal is configured as being of a first type, and the position of the reference signal in the signal is a first symbol of a corresponding time-domain resource segment.

7. The apparatus according to claim 1, wherein the network device configures one or more first type of reference signals and one or more second type of reference signals, the data channel in the signal is configured as being of a first type, and the position of the reference signal in the signal is a position determined according to at least one of the following: a symbol length of a corresponding time-domain resource segment, time-domain resource allocation configuration or indication of the corresponding time-domain resource segment, higher layer signaling configuration, and a provision in a specification.

8. The apparatus according to claim 1, wherein the network device configures one or more first type of reference signals and one or more second type of reference signals, the data channel in the signal is configured as being of a first type, and the position of the reference signal in the signal is at least one of the following:
a first symbol of a corresponding time-domain resource segment, a second symbol of the corresponding time-domain resource segment, and a reference signal position to which the first type corresponds.

9. The apparatus according to claim 1, wherein the network device configures one or more first type of reference signals, the data channel in the signal is configured as being of a first type, and the position of the reference signal in the signal is a first symbol and/or a second symbol of a corresponding time-domain resource segment.

10. The apparatus according to claim 1, wherein the network device configures one or more first type of reference signals, the data channel in the signal is configured as being of a second type, and the position of the reference signal in the signal is a first symbol and/or a second symbol of a corresponding time-domain resource segment.

11. The apparatus according to claim 1, wherein the command configuring or indicating repetition of a data channel or a transport block comprises: configuring or indicating the repetition of the transport block by the network device only via higher layer signaling, the higher layer signaling comprising a first parameter, the first parameter indicating the repetition of the transport block, or the first parameter indicating repetitions of the transport block and a number, which is an integer greater than or equal to 0, of the repetitions.

12. The apparatus according to claim 1, wherein the command configuring or indicating repetition of a data channel or a transport block comprises:
configuring or indicating the repetition of the transport block by the network device only via higher layer signaling, the higher layer signaling comprising a second parameter, the second parameter enabling or disabling a number, which is an integer greater than or equal to 0, of dynamic nominal repetitions; wherein, when the number of dynamic nominal repetitions is enabled by the second parameter, the repetition of the transport block is enabled, and when the number of dynamic nominal repetitions is disabled by the second parameter, the repetition of the transport block is disabled.

13. The apparatus according to claim 12, wherein when the number of dynamic nominal repetitions is enabled by the second parameter and the number of dynamic nominal repetitions is greater than or equal to a first value, the repetition of the transport block is enabled, and when the number of dynamic nominal repetitions is disabled by the second parameter, or the number of dynamic nominal repetitions is enabled by the second parameter but the number of dynamic nominal repetitions is less than or equal to a second value, the repetition of the transport block is disabled.

14. The apparatus according to claim 1, wherein the indication field comprises at least one of the following:
- a DCI field used for indicating a number, which is an integer greater than or equal to 0, of nominal repetitions;
- a DCI field used for indicating time-domain resource allocation;
- an information field used for indicating a mode of repetition and/or the number of nominal repetitions; and
- an information field used for indicating the number of nominal repetitions and/or a mode of time-domain resource allocation.

15. The apparatus according to claim 1, wherein the command configuring or indicating repetition of a data channel or a transport block comprises:
configuring or indicating the repetition of the transport block by the network device via higher layer signaling and downlink control information, the higher layer signaling comprising a fourth parameter, the fourth parameter configuring or indicating the repetition of the transport block, and a format of the downlink control information being associated with whether to enable the repetition.

16. The apparatus according to claim 1, wherein
the first repetition is performed on consecutive slots, and
the second repetition is performed on consecutive symbols.

17. An apparatus for transmitting a reference signal, configured in a terminal equipment, the apparatus comprising,
processor circuitry configured to generate one or more actual repetitions corresponding to the same transport block, each of the one or more actual repetitions comprising a data channel and a reference signal;
a transmitter configured to transmit the one or more actual repetitions in one or more time-domain resource segments in which the one or more actual repetitions are located, positions of reference signals in the one or more actual repetitions being determined based on the one or more time-domain resource segments in which the one or more actual repetitions are located; and
a receiver configured to, before the transmitter transmits the signal, receive a command transmitted by a network device, the command configuring or indicating repetition of a data channel or a transport block, wherein
the command configuring or indicating repetition of a data channel or a transport block comprises: configuring or indicating the repetition of the transport block by the network device via higher layer signaling and downlink control information, the higher layer signaling comprising a third parameter, the third parameter configuring or indicating the repetition of the transport block, and the downlink control information comprising an indication field, the indication field indicating whether to enable the repetition, and the indication field indicating dynamic switching between a first repetition and a second repetition,
the first repetition corresponds to R15 repetition, and
the second repetition corresponds to R16 repetition.

* * * * *